US011300190B1

(12) United States Patent
Pack et al.

(10) Patent No.: US 11,300,190 B1
(45) Date of Patent: Apr. 12, 2022

(54) GEAR ASSEMBLY WITH OPTIMIZED CONFIGURATION FOR MESH STIFFNESS

(71) Applicant: GM GLOBAL TECHNOLOGY OPERATIONS LLC, Detroit, MI (US)

(72) Inventors: Seongchan Pack, West Bloomfield, MI (US); Mohammad Hotait, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 17/036,796

(22) Filed: Sep. 29, 2020

(51) Int. Cl.
*F16H 55/06* (2006.01)
*F16H 1/06* (2006.01)

(52) U.S. Cl.
CPC ............ *F16H 55/06* (2013.01); *F16H 1/06* (2013.01)

(58) Field of Classification Search
CPC .......... F16H 55/06; F16H 55/08; F16H 55/14; F16H 55/18; F16H 1/06; F16H 7/0829; F16H 7/0831; F16H 7/0838; F16H 2055/185; F16H 2055/065
See application file for complete search history.

(56) References Cited

U.S. PATENT DOCUMENTS

| | | | | |
|---|---|---|---|---|
| 4,589,300 A * | 5/1986 | Rouverol | ................. | F16H 55/08 74/457 |
| 4,589,860 A * | 5/1986 | Brandenstein | .......... | F16H 55/06 474/152 |
| 4,651,588 A * | 3/1987 | Rouverol | ............ | F16H 55/0806 74/462 |
| 5,083,474 A * | 1/1992 | Rouverol | ............ | F16H 55/0806 74/461 |
| 5,341,699 A * | 8/1994 | Rouverol | ................ | F16H 55/08 74/462 |
| 5,485,761 A * | 1/1996 | Rouverol | ................ | F16H 55/08 29/893.3 |
| 5,802,921 A * | 9/1998 | Rouverol | ............ | F16H 55/0806 74/458 |
| 9,915,335 B2 * | 3/2018 | Enghels | ................... | C21D 9/32 |
| 2007/0180943 A1 * | 8/2007 | Daout | ..................... | F16H 55/16 74/457 |
| 2013/0116937 A1 * | 5/2013 | Calhoun | ................. | G06F 17/00 702/35 |
| 2014/0093196 A1 * | 4/2014 | Scheibe | ................. | F16C 3/026 384/42 |
| 2017/0292598 A1 * | 10/2017 | Moore | ................. | B22D 21/007 |
| 2017/0335445 A1 * | 11/2017 | Kuznetsov | ............. | F16H 55/06 |

(Continued)

*Primary Examiner* — William Kelleher
*Assistant Examiner* — Gregory T Prather
(74) *Attorney, Agent, or Firm* — Quinn IP Law (57) ABSTRACT

A gear assembly includes a first gear having a first hub surrounded by a first plurality of teeth. The first plurality of teeth each define a respective first contact region. The gear assembly includes a second gear having a second hub surrounded by a second plurality of teeth. The second plurality of teeth are adapted to mesh with the first plurality of teeth at the respective first contact region in order to drive a respective load in a first direction. The first hub and the first plurality of teeth include respective zones defining a respective elastic modulus. A three-dimensional distribution of the respective physical size and the respective elastic modulus of the respective zones is optimized such that a fluctuation of mesh stiffness along the respective first contact region is at or below a first predefined threshold.

18 Claims, 3 Drawing Sheets

(56) References Cited

U.S. PATENT DOCUMENTS

| | | | |
|---|---|---|---|
| 2018/0003283 A1* | 1/2018 | James | G06F 30/17 |
| 2019/0316669 A1* | 10/2019 | Elder | F16H 55/17 |
| 2021/0172508 A1* | 6/2021 | Spruce | F02K 3/06 |

* cited by examiner

GEAR ASSEMBLY WITH OPTIMIZED CONFIGURATION FOR MESH STIFFNESS

INTRODUCTION

The disclosure relates generally to a gear assembly and more particularly, to a gear assembly with an optimized configuration for mesh stiffness. The optimized configuration effectively reduces noise, vibration and scuffing resistance. Gears provide a practical method for transmitting motion and mechanical power between pairs of rotating shafts. Because of their reliability and versatility, gears are one of the most widely used machine elements in power transmission systems. Gears are employed in a number of industries, such as automotive, aerospace, and other industries. Meeting different gear performance metrics continues to be a challenge due to inherent design trade-offs, such as in the case of noise and vibration (NVH) and scuffing resistance. The system dynamics of gears are generally sensitive to transmission error. These effects are particularly pronounced in high-speed and high-power density geared systems in electrical drive units.

SUMMARY

Disclosed herein is a gear assembly having a first gear with a first hub surrounded by a first plurality of teeth. The first plurality of teeth each define a respective first contact region. The gear assembly includes a second gear having a second hub surrounded by a second plurality of teeth. The second plurality of teeth are adapted to mesh with the first plurality of teeth at the respective first contact region in order to drive a respective load in a first direction. The first hub and the first plurality of teeth include respective zones defining a respective elastic modulus. A three-dimensional distribution of the respective physical size and the respective elastic modulus of the respective zones is optimized such that a fluctuation of mesh stiffness along the respective first contact region is at or below a first predefined threshold.

The respective elastic modulus may be modulated by varying a material composition of the respective zones. In some embodiments, the respective zones are composed of a thermoplastic and/or a thermoset material. In some embodiments, the respective zones are each composed of respective fibers embedded in a polymeric matrix, with the respective fibers in the respective zones being oriented in a respective alignment. The respective elastic modulus of the respective zones may be modulated by varying the respective alignment across the respective zones. The respective fibers may include at least one of glass beads, marble beads, glass fibers and carbon fibers.

In one embodiment, the respective zones include a first zone having the respective fibers arranged in a first alignment, and a second zone having the respective fibers arranged in a second alignment. The second alignment is at an angle relative to the first alignment, the angle being between 45 and 90 degrees. In one example, the angle between the first alignment and the second alignment is 90 degrees.

The first plurality of teeth may include one or more energy dissipation zones ("one or more" omitted henceforth) at respective locations along the respective first contact region, the respective first contact region defining a base temperature profile. The energy dissipation zones are positioned to substantially flatten the base temperature profile. The energy dissipation zones include metallic coatings applied over the respective first contact region.

In some embodiments, the first plurality of teeth each incorporate an asymmetric configuration. In other embodiments, the first plurality of teeth each incorporate a symmetric configuration. The first plurality of teeth each define a respective second contact region opposing the respective first contact region. The second plurality of teeth are adapted to mesh with the respective second contact region in order to drive the respective load in a second direction, the second direction being opposite to the first direction. The three-dimensional distribution of the respective physical size and the respective elastic modulus of the respective zones is adjusted such that the fluctuation of the mesh stiffness along the respective second contact region is at or below a second predefined threshold.

Disclosed herein is a gear assembly including a first gear having a first hub surrounded by a first plurality of teeth, the first plurality of teeth each defining a respective first contact region and a respective second contact region. A second gear having a second hub is surrounded by a second plurality of teeth. The second plurality of teeth is adapted to mesh with the first plurality of teeth at the respective first contact region in order to drive a respective load in a first direction, and at the respective second contact region in order to drive the respective load in a second direction.

The first hub and the first plurality of teeth include respective zones defining a respective physical size and a respective elastic modulus. The first gear is characterized by an optimized three-dimensional distribution of the respective physical size and the respective elastic modulus of the respective zones such that a fluctuation of a mesh stiffness along the respective first contact region is at or below a first predefined threshold and the fluctuation of the mesh stiffness along the respective second contact region is at or below a second predefined threshold.

Disclosed herein is a device having an input shaft adapted to receive energy from an energy source, and a gear assembly operatively connected to the input shaft. The gear assembly includes a first gear with a first hub surrounded by a first plurality of teeth, the first plurality of teeth each defining a respective first contact region. An output shaft is operatively connected to the gear assembly. The gear assembly includes a second gear having a second hub surrounded by a second plurality of teeth, second plurality of teeth being adapted to mesh with the first plurality of teeth at the respective first contact region in order to drive a load in a first direction.

The first hub and the first plurality of teeth of the device include respective zones defining a respective physical size and a respective elastic modulus. A three-dimensional distribution of the respective physical size and the respective elastic modulus of the respective zones is optimized such that a fluctuation of mesh stiffness along the respective first contact region is at or below a first predefined threshold. The gear assembly enables variable gear mesh compliance as a function of load location by optimizing effective material elastic modulus. In some embodiments, this is accomplished by varying orientation of fiber-reinforced composites.

The above features and advantages and other features and advantages of the present disclosure are readily apparent from the following detailed description of the best modes for carrying out the disclosure when taken in connection with the accompanying drawings.

DETAILED DESCRIPTION

Figure 1:
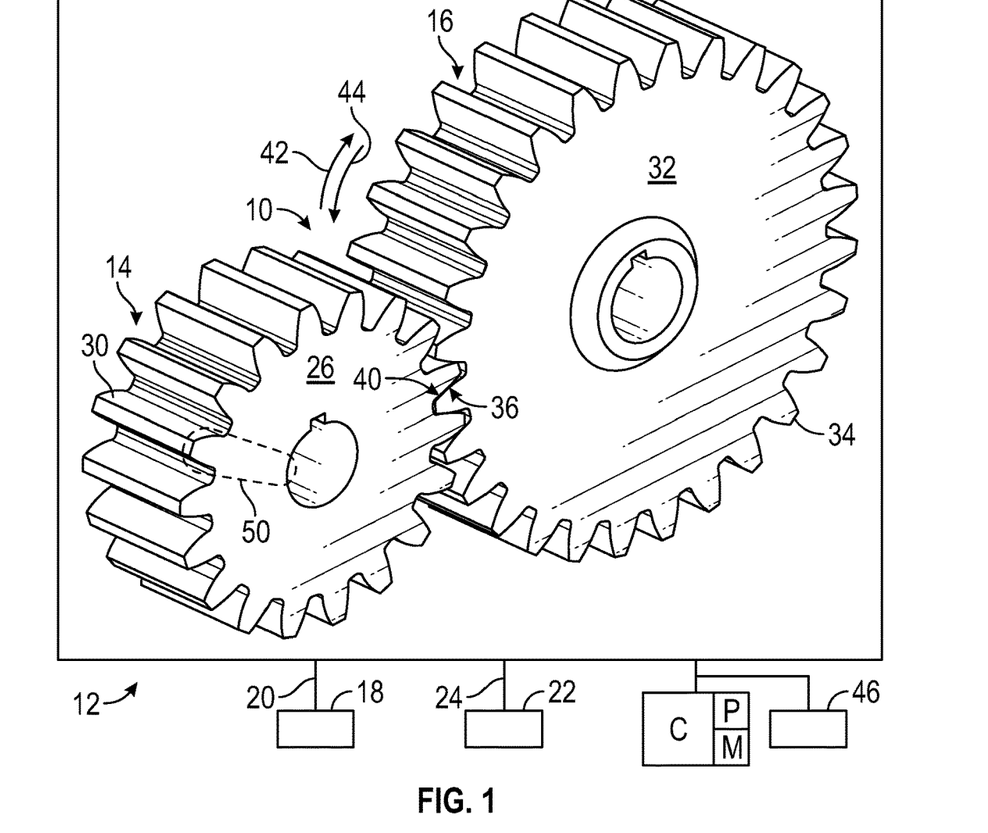
FIG. 1 is a schematic fragmentary view of a gear assembly having a first gear and a second gear.

Referring to the drawings, wherein like reference numbers refer to like components, FIG. 1 schematically illustrates a gear assembly 10, which may be part of a device 12. The device 12 may be a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, airplane and train. It is to be understood that the device 12 may take many different forms.

Referring to FIG. 1, the gear assembly 10 includes a first gear 14 and a second gear 16. The gear assembly 10 may be operatively connected to an energy source 18 via an input shaft 20. The energy source 18 may be a battery, a motor/generator and/or an engine of the device 12. The gear assembly 10 may be utilized to transmit power from the energy source 18 to drive a load 22 via an output shaft 24. The first gear 14 may be a driving gear and the second gear 16 may be the driven gear and vice-versa.

Referring to FIG. 1, the first gear 14 includes a first hub 26 surrounded by a first plurality of teeth 30. The second gear 16 includes a second hub 32 surrounded by a second plurality of teeth 34. The first plurality of teeth 30 of the first gear 14 define a respective first contact region 36 adapted to mesh with an opposing first contact region 40 defined by the second plurality of teeth 34 of the second gear 16, in order to drive the load 22 in a first direction 42. Referring to FIG. 1, the first plurality of teeth 30 and the second plurality of teeth 34 may be adapted to mesh at the respective second contact region 38 (see FIG. 2) in order to drive the load 22 in a second direction 44, the second direction 44 being opposite to the first direction 42.

While the example in FIG. 1 illustrates spur gears, it is understood that the first gear 14 and the second gear 16 may incorporate other types and forms of gears. For example, the first gear 14 and the second gear 16 may be helical gears, cross-axis gears, straight bevel gears or spiral bevel gears. Furthermore, the gear assembly 10 may include additional components and additional gears not shown.

Figure 2:
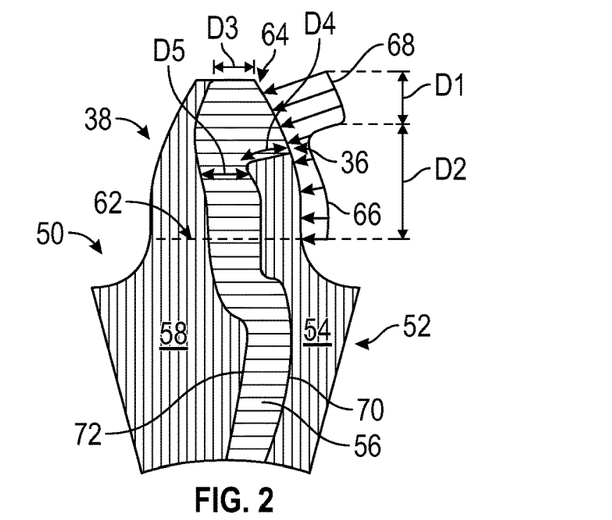
FIG. 2 is a schematic end view of a gear portion of the first gear of FIG. 1, in accordance with a first embodiment.

Referring now to FIG. 2, an end view is shown of a portion, referred to herein as gear portion 50, of the first gear 14 of FIG. 1. It is to be understood that the gear portion 50 represents a portion of either or both the first gear 14 and second gear 16. The gear portion 50 includes respective zones 52 each defining a respective elastic modulus. In the example shown, the respective zones 52 include a first zone 54, a second zone 56 and a third zone 58. The elastic modulus, sometimes referred to as modulus of elasticity, is an assessment of the resistance of the material to being deformed elastically when a stress is applied to it. The elastic modulus of an object may be understood as the slope of its stress-strain in the elastic deformation area. A stiffer material will have a higher elastic modulus.

The first gear 14 and the second gear 16 are understood to be in mesh when the respective teeth of the two gears are sufficiently in contact that the first gear 14 and the second gear 16 operate or turn together. There are one or more tooth pairs in contact at the same time, with the contact ratio representing the average number of teeth meshing at the same time. The number of tooth pairs in contact at the same time may fluctuate between one pair and two pairs, two pairs and three pairs etc. As the first gear 14 and second gear 16 rotate together, the contact force varies as a function of mesh cycle position. Referring to FIG. 2, as the mesh proceeds from the starting point 62 to the ending point 64 of a respective first contact region 36, the contact force changes from a first contact force 66 (where one tooth pair is in contact) to a second contact force 68 (where two teeth pairs are in contact). This results in a periodic variation in mesh stiffness and a dynamic increase of load.

Figure 3:
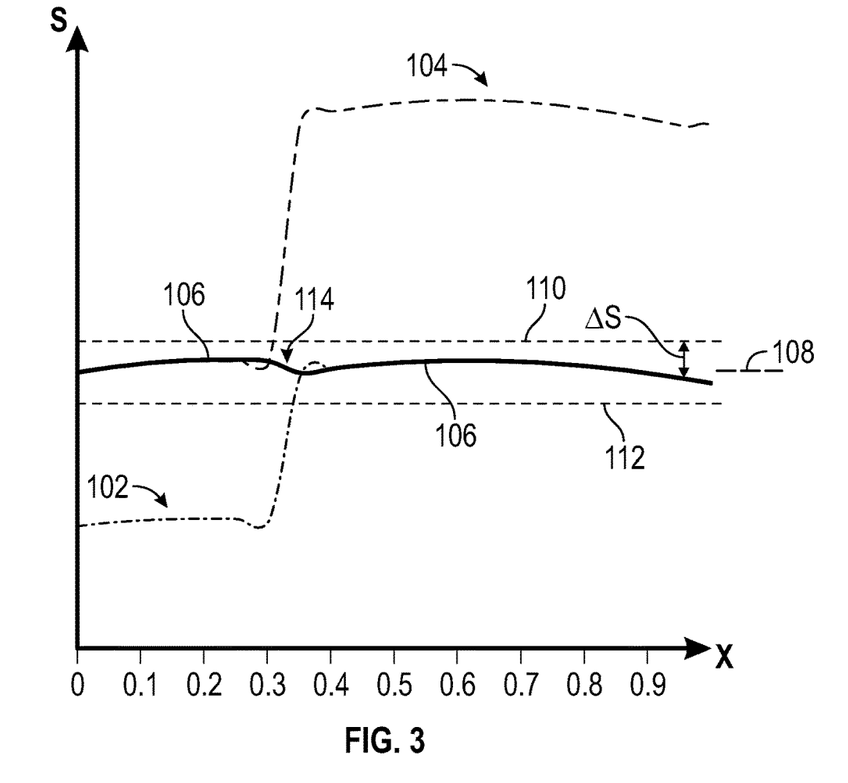
FIG. 3 is an example graph illustrating mesh stiffness (on the vertical axis) over mesh cycle (on the horizontal axis)

FIG. 3 is an example graph illustrating stiffness S along the respective first contact region 36 of the gear portion 50 of FIG. 2. The stiffness S is shown on the vertical axis and the mesh cycle X is shown on the horizontal axis. Trace 102 reflects the stiffness S of the first part of the mesh cycle, from the starting point 62 (see FIG. 2), corresponding to X=0. Trace 104 reflects the stiffness S of the second part of the mesh cycle, towards the ending point 64 (see FIG. 2), corresponding to X=1. The mesh stiffness may be composed of blank, tooth and Hertzian contact stiffnesses. Hertzian contact stress refers to the localized stresses that develop as two curved surfaces come in contact and deform slightly under the imposed loads. It provides contact stress as a function of the normal contact force, the radii of curvature of both bodies and the modulus of elasticity of both bodies.

The first gear 14 is constructed such that a three-dimensional distribution of the respective physical size and the respective elastic modulus of the respective zones 52 is optimized such that a fluctuation $\Delta S$ (in FIG. 3) in the mesh stiffness 106 along the respective first contact region 36 is at or below a first predefined threshold. In other words, the first gear 14 is constructed with a material (throughout the first plurality of teeth 30 and first hub 26) that reacts differently as the load 22 moves from the starting point 62 (see FIG. 2) to the ending point 64 of the respective first contact region 36, thereby flattening out the mesh stiffness 106. This provides the technical benefit of reducing gear noise and increasing power density. The second gear 16 may be similarly constructed. The fluctuation $\Delta S$ may be defined relative to a predetermined reference point. Referring to FIG. 3, the reference point may be an average value 108, a maximum stiffness 110, a minimum stiffness 112 or another predetermined reference point. A method 300 for forming the first gear 14 and/or the second gear 16 is shown and described below with respect to FIG. 6.

In some embodiments, the respective elastic modulus in the respective zones 52 is varied by changing the material composition of the respective zones 52. For example, the first zone 54 of FIG. 2 may be composed of a first thermoplastic, the second zone 56 may be composed of a second thermoplastic and the third zone 58 may be composed of a second thermoplastic. Referring to FIG. 2, the three-dimensional distribution would incorporate the respective magnitudes of the first distance D1, second distance D2, third distance D3, fourth distance D4, fifth distance D5 and other dimensions defining the respective zones 52. These distances would depend on the magnitude of the contact load and applied torque. Additionally, the three-dimensional distribution would incorporate the respective positions and shapes of the first border 70 (separating the first zone 54 and second zone 56) and the second border 72 (separating the second zone 56 and third zone 58).

Figure 4:
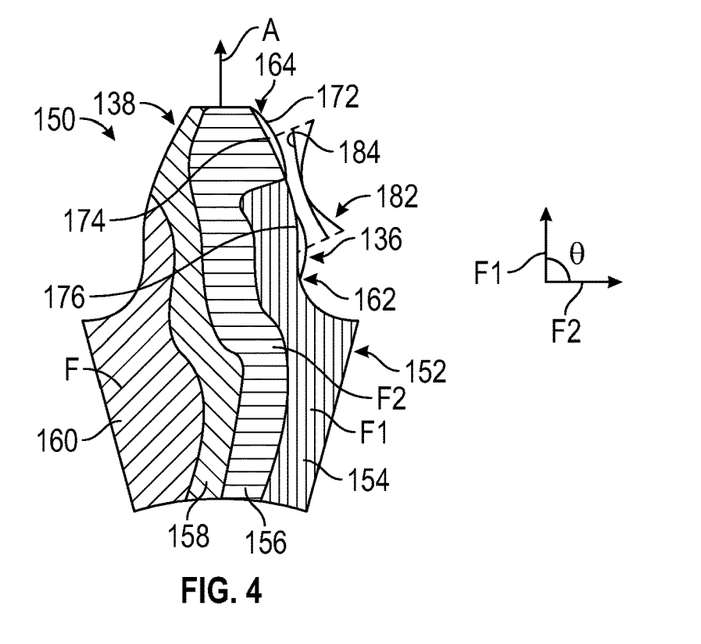
FIG. 4 is a schematic end view of a gear portion of the first gear of FIG. 1, in accordance with a second embodiment.

Referring now to FIG. 4, a gear portion 150 is shown, in accordance with a second embodiment. The gear portion 150 of FIG. 4 includes respective zones 152, such as a first zone 154, a second zone 156, a third zone 158 and a fourth zone 160. The respective zones 152 are composed of a polymeric matrix each having respective fillers F, referred to herein as respective fibers F, oriented in a specific alignment. The respective fibers F may include but are not limited to, marble beads, glass beads, glass fibers and carbon fibers. The alignment of the respective fibers F is changed across the respective zones 152 such that the mesh stiffness 106 of FIG. 4 is substantially constant. In other words, the first gear 14 may be constructed with a fiber-reinforced composite material and the variation in elastic modulus across the respective zones 152 may be achieved by modulating the alignment of the respective fibers F in the respective zones 152.

In the example shown in FIG. 4, the first zone 54 has respective fibers F1 arranged in a first alignment that is parallel to the central axis A. The second zone 56 has respective fibers F2 arranged in a second alignment that is angled relative to the first alignment. The angle θ (see FIG. 4) between adjacent alignments, such as between the first zone 54 and the second zone 56, may be varied to obtain the optimal mesh stiffness. The angle θ may be between 45 and 90 degrees. In one embodiment, the angle θ is 90 degrees.

The gear portion 150 of FIG. 4 incorporates an asymmetric configuration relative to a central axis A. This may be suitable for an application with unidirectional rotation, i.e., the first gear 14 (and/or second gear 16) are rotated in one direction but not the other. Alternatively, the optimization may be weighted to produce an asymmetric configuration. For example, the respective elastic modulus of the respective zones 52 may be optimized with an 80-20 split favoring a forward load direction (e.g. respective first contact region 236) over a reverse load direction (respective second contact region 238).

In some embodiments, the first gear 14 is characterized by an optimized three-dimensional distribution of the respective physical size and the respective elastic modulus of the respective zones 152 such that: (1) the fluctuation ΔS of the mesh stiffness 106 along the respective first contact region 136 is at or below a first predefined threshold; and (2) the fluctuation ΔS of the mesh stiffness 106 along the respective second contact region 138 is at or below a second predefined threshold. The second predefined threshold may be different from the first predefined threshold. In one example, the first predefined threshold is ±1% of an average value 108 of the mesh stiffness 106 and the second predefined threshold is ±5% of the average value 108.

Referring to FIG. 4, the gear portion 150 may include one or more energy dissipation zones 172, such as first energy dissipation zone 174 and second energy dissipation zone 176. The energy dissipation zones 172 are produced by applying metallic coatings at various positions in the first contact region 136. The energy dissipation zones 172 may be created by applying coatings of other heat/thermal conducting materials. The energy dissipation zones 172 enable desired local contact behavior while improving energy dissipation of generated heat from the sliding or contact. The location and thickness of the coating is adapted to adjust the local strength of a base temperature profile 182 and mitigate the heat generated at the first contact region 136.

Referring to FIG. 4, the base temperature profile 182 (see FIG. 4) between the starting point 162 and the ending point 164 of the first contact region 136 may be obtained via numerical simulation (see block 308 of FIG. 6 described below). As shown in FIG. 4, the post-coating temperature profile 184 is substantially flat or uniform at the first contact region 136. In one example, the thickness of the energy dissipation zones 172 is between 50 and 200 micrometers. The tensile strength of the coating material may be used to select the thickness of the coating. The energy dissipation zones 172 may be separated by gaps. For example, the gap may be between 1 and 10 mm.

Figure 5:
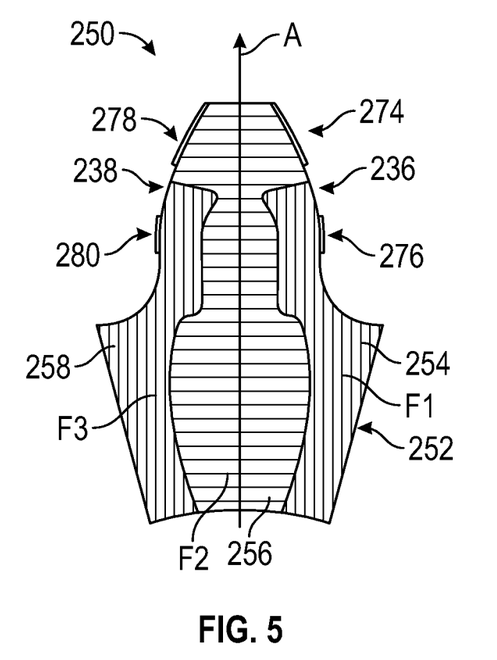
FIG. 5 is a schematic end view of a gear portion of the first gear of FIG. 1, in accordance with a third embodiment.

Referring now to FIG. 5, a gear portion 250 is shown, in accordance with a third embodiment. Unlike FIG. 4, the gear portion 250 of FIG. 5 incorporates a symmetric configuration relative to the central axis A. Similar to FIG. 4, the gear portion 250 of FIG. 5 includes respective zones 252, such as a first zone 254, a second zone 256 and a third zone 258, composed of a polymeric matrix with respective fibers F1, F2 and F3 in a specific alignment. The alignment of the respective fibers F1, F2 and F3 across the respective zones 252 may be modulated such that the fluctuation ΔS of the mesh stiffness 106 (see FIG. 3) on both sides of the gear portion 250 (in the respective first contact region 236 and respective second contact region 238) is at or below a first predefined threshold.

Similar to the embodiment shown in FIG. 4, the gear portion 250 of FIG. 5 may include one or more energy dissipation zones at the respective first contact region 236, such as first energy dissipation zone 274 and second energy dissipation zone 276. Additionally, the gear portion 250 may include one or more energy dissipation zones at the respective second contact region 238, such as a third energy dissipation zone 278 and a fourth energy dissipation zone 280. The respective locations of the various energy dissipation zones may be selected to coincide with "hot" zones (i.e. above a certain temperature) in a base temperature profile 182 (see FIG. 4), thereby flattening out and resulting in a post-coating temperature profile 184.

Figure 6:
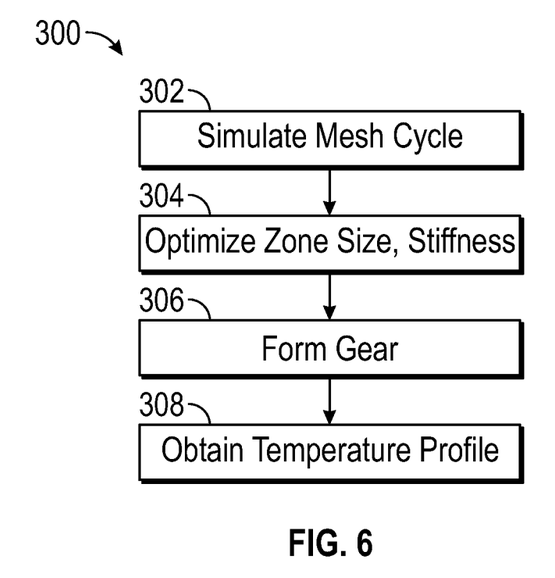
FIG. 6 is a flowchart of a method for forming the first gear and/or the second gear of FIG. 1.

Referring now to FIG. 6, a flowchart of a method 300 for forming the first gear 14 and/or the second gear 16 is shown. Method 300 may be stored on and at least partially executable by a controller C, shown in FIG. 1. The controller C has at least one processor P and at least one memory M (or non-transitory, tangible computer readable storage medium) on which instructions are recorded for executing the method 300. The memory M may store executable instruction sets, and the processor P may execute the instruction sets stored in the memory M.

The method 300 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 302 of FIG. 6, the controller C is configured to simulate a stiffness S in a mesh cycle X along the respective first contact region 36 and/or respective second contact region 38. In some embodiments, the simulation is performed by finite element analysis. Referring to FIG. 3, the location of the inflexion point 114 between the trace 102 and trace 104 may be obtained by numerical simulation. The controller C may employ statistical regression analysis, principal component analysis and other numerical simulation techniques available to those skilled in the art. Alternatively, the stiffness S may be assessed empirically based on the transmission error over the angular position is recorded at a constant torque and a sufficiently slow rotational speed, such that dynamic effects may be neglected.

Per block 304 of FIG. 6, the controller C is configured to select a predefined number of the respective zones 52. For example, the controller C may be configured to select each gear portion 50 (See FIG. 2) to be divided into three or four of the respective zones 52 (in total). Per block 304 of FIG. 6, the controller C is configured to determine a three-dimensional distribution of respective physical sizes and respective elastic modulus values for the respective zones 52. As noted previously, the three-dimensional distribution is optimized such that the fluctuation $\Delta S$ in the mesh stiffness 106 (see FIG. 3) at the respective first contact region 36 (and/or the respective second contact region 38) is at or below a first predefined threshold.

In some embodiments, the controller C may employ a machine learning model 46 embedded in the controller C or otherwise accessible to the controller C. The machine learning model 46 may be configured to find parameters, weights or a structure that minimizes a cost function, with the cost function characterizing the fluctuation $\Delta S$ in the mesh stiffness 106. For example, the machine learning model 46 may be a feedforward artificial neural network having multiple layers composed of respective nodes. The parameters of each respective node may be independent of others, i.e., characterized by a unique set of weights. The respective node in a subsequent layer computes a linear combination of the outputs of the previous layer. For example, a network with three layers would form an activation function $f(x)=f(3)(f(2)(f(1)(x)))$. The patterns recognized by the machine learning model 46 may be translated or converted into numerical form.

Per block 306 of FIG. 6, the first gear 14 and/or the second gear 16 may be formed with the parameters obtained in blocks 304 and 308, by injection molding or other technique available to those skilled in the art. In one example, the first gear 14 and/or the second gear 16 are formed by injection molding with thermosets and/or thermoplastics. The thermosets may include thermosetting polyester, polyurethane and/or epoxy. Suitable thermoplastics may include thermoplastic polyester, polyurethane, polyolefin, polycarbonate and/or polyamide. Additionally, processes such as forging, extruding, casting and 3D printing may be employed. Parameters such as the overall size of the gear, tooth shape, pitch, number of teeth, amount of profile shift may be varied based on the application at hand.

Per block 308 of FIG. 6, the controller C is configured to obtain a base temperature profile 182 (see FIG. 4) for the respective first contact region 36 and/or the, respective second contact region 38 via numerical simulation. The base temperature profile 182 is employed to map out location and sizes of various energy dissipation zones 172 along the first contact region 136 and/or second contact region 138. The energy dissipation zones 172 coincide with "hot" zones of the base temperature profile 182, i.e. zones above a certain temperature threshold. As noted above, the energy dissipation zones 172 are created by applying coatings of metal (e.g. alloys of steel) or other heat/thermal conducting materials having a sufficiently high tensile strength. The energy dissipation zones 172 enable desired local contact behavior while improving energy dissipation of generated heat from the sliding or contact.

In summary, the gear assembly 10 enables variable gear mesh compliance as a function of load location by optimizing effective material elastic modulus. In some embodiments, this is accomplished by varying orientations of fiber-reinforced composites.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical and physical media with patterns of holes, a RAM, a PROM, an EPROM, a FLASH-EEPROM, other memory chips or cartridges, or other media from which a computer may read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 6 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A gear assembly comprising:
a first gear having a first hub surrounded by a first plurality of teeth, the first plurality of teeth each defining a respective first contact region;
a second gear having a second hub surrounded by a second plurality of teeth, second plurality of teeth being adapted to mesh with the first plurality of teeth at the respective first contact region in order to drive a respective load in a first direction;
wherein the first hub and the first plurality of teeth include respective zones defining a respective physical size and a respective elastic modulus; and
wherein a three-dimensional distribution of the respective physical size and the respective elastic modulus of the respective zones is optimized such that a fluctuation of mesh stiffness along the respective first contact region is at or below a first predefined threshold.

2. The gear assembly of claim 1, wherein:
the respective elastic modulus is modulated by varying a material composition of the respective zones.

3. The gear assembly of claim 2, wherein:
the respective zones are composed of a thermoplastic and/or a thermoset material.

4. The gear assembly of claim 1, wherein:
the respective zones are each composed of respective fibers embedded in a polymeric matrix, the respective fibers in the respective zones being oriented in a respective alignment; and
the respective elastic modulus of the respective zones is modulated by varying the respective alignment across the respective zones.

5. The gear assembly of claim 4, wherein:
the respective fibers include at least one of glass beads, marble beads, glass fibers and carbon fibers.

6. The gear assembly of claim 4, wherein:
the respective zones include a first zone having the respective fibers arranged in a first alignment; and
the respective zones include a second zone having the respective fibers arranged in a second alignment at an angle relative to the first alignment, the angle being between 45 and 90 degrees.

7. The gear assembly of claim 6, wherein:
the angle between the first alignment and the second alignment is 90 degrees.

8. The gear assembly of claim 1, wherein:
the first plurality of teeth includes one or more energy dissipation zones at respective locations along the respective first contact region, the respective first contact region defining a base temperature profile; and
the one or more energy dissipation zones are positioned to substantially flatten the base temperature profile.

9. The gear assembly of claim 8, wherein:
the one or more energy dissipation zones include metallic coatings applied over the respective first contact region.

10. The gear assembly of claim 1, wherein:
the first plurality of teeth each incorporate an asymmetric configuration.

11. The gear assembly of claim 1, wherein:
the first plurality of teeth each incorporate a symmetric configuration.

12. The gear assembly of claim 1, wherein:
the first plurality of teeth each define a respective second contact region opposing the respective first contact region;
the second plurality of teeth are adapted to mesh with the respective second contact region in order to drive the respective load in a second direction, the second direction being opposite to the first direction; and
the three-dimensional distribution of the respective physical size and the respective elastic modulus of the respective zones is adjusted such that the fluctuation of the mesh stiffness along the respective second contact region is at or below a second predefined threshold.

13. A gear assembly comprising:
a first gear having a first hub surrounded by a first plurality of teeth, the first plurality of teeth each defining a respective first contact region and a respective second contact region;
a second gear having a second hub surrounded by a second plurality of teeth;
wherein the second plurality of teeth is adapted to mesh with the first plurality of teeth at the respective first contact region in order to drive a respective load in a first direction, and at the respective second contact region in order to drive the respective load in a second direction;
wherein the first hub and the first plurality of teeth include respective zones defining a respective physical size and a respective elastic modulus; and
wherein the first gear is characterized by an optimized three-dimensional distribution of the respective physical size and the respective elastic modulus of the respective zones such that a fluctuation of a mesh stiffness along the respective first contact region is at or below a first predefined threshold and the fluctuation of the mesh stiffness along the respective second contact region is at or below a second predefined threshold.

14. The gear assembly of claim 13, wherein:
the respective zones are each composed of respective fibers embedded in a polymeric matrix, the respective fibers in the respective zones being oriented in a respective alignment; and
the respective elastic modulus of the respective zones is modulated by varying the respective alignment across the respective zones.

15. The gear assembly of claim 14, wherein:
the respective fibers include at least one of glass beads, marble beads, glass fibers and carbon fibers.

16. The gear assembly of claim 14, wherein:

the first plurality of teeth includes one or more energy dissipation zones at respective locations along the respective first contact region, the respective first contact region defining a base temperature profile; and the one or more energy dissipation zones are positioned to substantially flatten the base temperature profile.

17. The gear assembly of claim 16, wherein:

the one or more energy dissipation zones include metallic coatings applied over the respective first contact region.

18. A device comprising:

an input shaft adapted to receive energy from an energy source;

a gear assembly operatively connected to the input shaft, the gear assembly having a first gear with a first hub surrounded by a first plurality of teeth, the first plurality of teeth each defining a respective first contact region;

an output shaft operatively connected to the gear assembly;

wherein the gear assembly includes a second gear having a second hub surrounded by a second plurality of teeth, second plurality of teeth being adapted to mesh with the first plurality of teeth at the respective first contact region in order to drive a load in a first direction;

wherein the first hub and the first plurality of teeth include respective zones defining a respective physical size and a respective elastic modulus; and wherein a three-dimensional distribution of the respective physical size and the respective elastic modulus of the respective zones is optimized such that a fluctuation of mesh stiffness along the respective first contact region is at or below a first predefined threshold.

\* \* \* \* \*